(12) United States Patent
Reed et al.

(10) Patent No.: US 8,739,112 B1
(45) Date of Patent: May 27, 2014

(54) DEVELOPERS' RESOURCE PORTAL

(75) Inventors: Carl Reed, Hoboken, NJ (US); Michael Marzo, Millington, NJ (US); Phillip Nosonowitz, New Rochelle, NY (US)

(73) Assignee: Goldman, Sachs & Co., New York, NY (US)

( * ) Notice: Subject to any disclaimer, the term of this patent is extended or adjusted under 35 U.S.C. 154(b) by 68 days.

(21) Appl. No.: 11/342,358

(22) Filed: Jan. 27, 2006

Related U.S. Application Data

(63) Continuation of application No. 10/225,641, filed on Aug. 22, 2002, now abandoned.

(60) Provisional application No. 60/315,086, filed on Aug. 27, 2001.

(51) Int. Cl.
*G06F 9/44* (2006.01)

(52) U.S. Cl.
USPC ............................ 717/103; 717/101; 717/105

(58) Field of Classification Search
USPC .......................................... 717/102, 103, 100
See application file for complete search history.

(56) References Cited

U.S. PATENT DOCUMENTS

| | | | | |
|---|---|---|---|---|
| 5,649,200 | A * | 7/1997 | Leblang et al. | 717/122 |
| 5,675,802 | A * | 10/1997 | Allen et al. | 717/103 |
| 6,061,517 | A * | 5/2000 | House et al. | 717/115 |
| 6,158,045 | A * | 12/2000 | You | 717/124 |
| 6,163,878 | A * | 12/2000 | Kohl | 717/103 |
| 6,230,312 | B1 * | 5/2001 | Hunt | 717/108 |
| 6,253,368 | B1 * | 6/2001 | Nelin et al. | 717/124 |
| 6,256,773 | B1 * | 7/2001 | Bowman-Amuah | 717/121 |
| 6,370,573 | B1 * | 4/2002 | Bowman-Amuah | 709/223 |
| 6,405,364 | B1 * | 6/2002 | Bowman-Amuah | 717/101 |
| 6,473,794 | B1 | 10/2002 | Guheen et al. | |
| 6,536,037 | B1 * | 3/2003 | Barrese et al. | 717/151 |
| 6,601,057 | B1 | 7/2003 | Underwood et al. | |
| 6,601,233 | B1 * | 7/2003 | Underwood | 717/102 |
| 6,609,246 | B1 * | 8/2003 | Guhr et al. | 717/103 |
| 6,618,854 | B1 * | 9/2003 | Mann | 717/124 |
| 6,629,315 | B1 * | 9/2003 | Naylor | 717/168 |
| 6,662,357 | B1 * | 12/2003 | Bowman-Amuah | 717/120 |
| 6,718,535 | B1 * | 4/2004 | Underwood | 717/101 |
| 6,728,947 | B1 * | 4/2004 | Bengston | 717/103 |
| 6,738,964 | B1 * | 5/2004 | Zink et al. | 717/105 |
| 6,775,703 | B1 * | 8/2004 | Burns et al. | 709/228 |
| 6,789,252 | B1 * | 9/2004 | Burke et al. | 717/100 |
| 6,799,314 | B2 * | 9/2004 | Beniyama et al. | 717/100 |

(Continued)

FOREIGN PATENT DOCUMENTS

EP   1186997 A2 *  3/2002  ............... G06F 9/44

OTHER PUBLICATIONS

Pant, Somendra; Ravichandran, T; "A framework for information systems planning for e-business", p. 85-98, 2001, retrieved from scholar.google.com search Jul. 23, 2007.*

(Continued)

*Primary Examiner* — Wei Zhen
*Assistant Examiner* — Matthew Brophy
(74) *Attorney, Agent, or Firm* — Perkins Coie LLP

(57) ABSTRACT

A Web-based system and method including a multifunctional Web portal for extending the resources, capacities and services offerings of an enterprise's IT/IS and developer community. The portal allows for wider collaboration within the community and provides a variety of useful development features such as research, best practices, training and access to online expertise.

38 Claims, 2 Drawing Sheets

(56) References Cited

U.S. PATENT DOCUMENTS

| | | | |
|---|---|---|---|
| 7,047,518 B2 * | 5/2006 | Little et al. | 717/108 |
| 7,055,136 B2 * | 5/2006 | Dzoba et al. | 717/125 |
| 7,134,122 B1 * | 11/2006 | Sero et al. | 717/177 |
| 7,139,999 B2 * | 11/2006 | Bowman-Amuah | 717/101 |
| 7,143,186 B2 * | 11/2006 | Stewart et al. | 709/245 |
| 7,152,207 B1 * | 12/2006 | Underwood et al. | 715/526 |
| 7,246,055 B1 * | 7/2007 | Singh | 703/20 |
| 2001/0052108 A1 * | 12/2001 | Bowman-Amuah | 717/1 |
| 2002/0026630 A1 * | 2/2002 | Schmidt et al. | 717/103 |
| 2002/0049788 A1 | 4/2002 | Lipkin et al. | |
| 2002/0057678 A1 | 5/2002 | Jiang et al. | |
| 2002/0059425 A1 | 5/2002 | Belfiore et al. | |
| 2002/0133392 A1 | 9/2002 | Angel et al. | |
| 2002/0144255 A1 * | 10/2002 | Anderson | 717/174 |
| 2003/0009740 A1 | 1/2003 | Lan | |
| 2003/0033191 A1 * | 2/2003 | Davies et al. | 705/10 |
| 2003/0046441 A1 * | 3/2003 | Rau et al. | 709/315 |
| 2004/0031030 A1 * | 2/2004 | Kidder et al. | 717/172 |

OTHER PUBLICATIONS

Linthicum, David; "B2B application integration: e-business enable your enterprise", Jan. 2001, retrieved from scholar.google.com search Jul. 23, 2007.*

Papazoglou, Mike P; "Agent-oriented technology in support of e-business", Apr. 2001, retrieved from ACM Portal 07/232/2007.*

F.L. Chan, M.D. Spiller, and A.R. Newton, "WELD: An Environment for Web-Based Electronic Design," Proc. Design Automation Conf. (DAC 98), ACM Press, New York, 1998, pp. 146-151.*

Lihui Wang; Wong, B.; Weiming Shen; Sherman Lang; , "A Web-based collaborative workspace using Java 3D," Computer Supported Cooperative Work in Design, The Sixth International Conference on, 2001 , vol., no., pp. 77-82, 2001 doi: 10.1109/CSCWD.2001. 942235.*

Lindvall, Mikael, Dirk Muthig, Aldo Dagnino, Christina Wallin, Michael Stupperich, David Kiefer, John May, and Tuomo Kahkonen. "Agile software development in large organizations." Computer 37, No. 12 (2004): 26-34.*

Web-Based Development of Complex Information Products, Fielding, Roy T.; Whitehead., E. James,; Anderson, Kenneth M.; Bolcer, Gregory A.; Oreizy, Peyman; Taylor, Richard N.; Fielding, Roy T.. Communications of the ACM (0001-0782) Aug. 1, 1998.vol. 41,Iss. 8;p. 84-92.*

* cited by examiner

DEVELOPERS' RESOURCE PORTAL

CROSS-REFERENCE TO RELATED APPLICATION

This application is a Continuation of U.S. patent application Ser. No. 10/225,641 filed Aug. 22, 2002 which claims the benefit of U.S. Provisional Application No. 60/315,086, filed Aug. 27, 2001.

FIELD OF THE INVENTION

The present invention relates in general to a Web-based system and method for enabling collaborative interaction among groups and individuals of a business enterprise and, in particular, to a Web-based system and method involving a Web portal that can be used by groups and individuals of a business enterprise to enhance information sharing and productivity within the enterprise.

BACKGROUND OF THE INVENTION

Many large businesses must deliver communications and technology services to a large and globally distributed development community. Many of these enterprises are unable to provide adequate scalability and leverage of certain of their service groups, such as their information technology/information services (IT/IS) groups, whereby the resources of those groups can be deployed to their fullest potential and to the optimum benefit of the enterprise.

In the past, service groups like IT/IS have been engaged to help, recommend and support the architectural guidelines within an enterprise, continuously monitoring the latest available technologies in the market, responding to inquiries from the enterprise's developer community, and providing resources in various forms. Acting as ambassadors between projects addressing analogous problems ranging from code guidelines to specific implementation questions, these groups are part of an essential central services network. At the same time, increases in an enterprise's physical growth, technology requirements and development costs have further highlighted the need to optimize this kind of approach. By enhancing communication and collaboration, promoting technology standards and best practices, and better leveraging communication throughout the enterprise, a large business entity can realize significant cost reduction and productivity gain.

An advantage exists, therefore, for Web-based system and method involving a Web portal that can be used by groups and individuals of a business enterprise to promote collaboration, knowledge sharing, best practices and information reuse across an enterprise's IT/IS and developer community.

SUMMARY OF THE INVENTION

The present invention provides a Web-based system and method including a multifunctional Web portal for extending the resources, capacities and services offerings of an enterprise's IT/IS and developer community. The portal allows for wider collaboration within the community and provides a variety of useful development features such as research, best practices, training and access to online expertise. The portal framework is preferably a content-neutral delivery vehicle and designed generically to support platform independence including, without limitation, JAVA/J2EE and other relevant JAVA enterprise development technologies. The portal allows for:

management of consistent technology implementations throughout a large business enterprise;

easy access for developers to a wealth of information designed to increase development productivity including standards, best practices, and reusable solutions;

leveraging of internal and external technology knowledge and solutions, including the efficient "scaling" of senior enterprise experience and expertise;

a single destination for the access of important information, knowledge, and collaboration needed to get critical projects completed faster and with higher quality;

technical skills enhancement through online training and hands-on lab activities;

enhanced collaboration with external expertise from technology sector vendors such as Sun Microsystems, Inc., International Business Machines Corporation and BEA Systems, Inc.;

easy access to re-usable source code, components and application frameworks; and implementation of a moderated mechanism to foster innovation from the developer community to deliver re-usable source code, components and frameworks The portal is preferably constructed through the use, purchase, extension and integration of internally or commercially available off-the-shelf (COTS) applications, thereby minimizing internal enterprise development costs and providing a faster time to market. The majority of currently available portal implementations provide access to various content, but do not integrate services specifically targeted at enhancing the productivity of a geographically distributed developer community. The portal of the present invention overcomes this disadvantage by leveraging as much as possible from existing and available portal frameworks and underlying services to provide seamless integration across the required services and their population with meaningful and high quality content.

The portal makes use of the already available information and infrastructure within a business enterprise. The system is browser based, and may be accessible from within the business' Intranet and remotely via Internet-capable devices such as a personal computer (PC), laptop computer, personal digital assistant (PDA), cellular telephone or the like. Interfacing to an existing Kerberos or other network authentication system as well as to the corporate lightweight directory access protocol (LDAP) will provide the necessary identification of each user entering the portal.

As a portal implementation, the portal provides content made available internally and through external content and service providers. External content and service providers interface with the system through negotiated mechanisms and may includes content from organizations and companies such as Gartner, Inc., International Business Machines Corporation and the Javasoft/SunED organizations of Sun Microsystems, Inc. Requiring an underlying repository, the system interfaces to Sybase®, UDB® and related data and business applications typically available within the enterprise.

The primary beneficiaries of the system and method according to the invention within a business enterprise are the groups supporting the developer community, the developer community itself and their associated management. From a beneficiary's perspective, the groups supporting the developer community are interested in centralizing service offerings while standardizing the services provided. These groups will play also a moderating role to maintain the quality and automation of the services provided. The developer community's interest is in usability, leverage of cross-communication, and enhancing skills and technical knowledge. Key points are usability, reflected in presentation to the user, ease of use from a process and workflow perspective and availability. The associated management is interested in increasing developer productivity and primary systemic qualities including extensibility, reliability, scalability, security and cost effectiveness.

The portal's business value comes from cost reduction and increased productivity in application development at the enterprise level. The sources of value are equally attributable to the portal's services and its content. Towards delivering this value, the portal is a community that provides a set of tools and services to allow for the identification, development, and distribution of reusable, pre-packaged, technical solutions to solve patterns of business problems. Its capacity for reusability of existing enterprise knowledge and information contributes towards both cost reduction and increased productivity, while the pre-packaged nature of portal facets contributes towards cost savings by reducing the risk associated wits its usage.

The portal is a productivity tool for developers to rapidly scale the learning curve. It provides the necessary hands-on, tactical learning experience to become instantly proficient in the latest technology and its applicability within an enterprise's business applications.

It is also a delivery vehicle to proliferate content such as white papers and guidelines across an enterprise. It enhances the value of content, like enterprise directives and standard methodologies, generated outside the context of the portal. This delivery mechanism contributes directly towards reducing the cost of disseminating content.

In addition, the portal is a knowledge amplifier. Enterprise groups like IT/IS have finite resources available to them for providing their services to the enterprise. The portal becomes a vehicle where the community itself supplies the additional knowledge sources/thought leaders to provide the level of service that is necessary to meet demand. This productivity gain is essentially obtained by enabling an IT/IS group's services to scale across the enterprise.

The portal is also a resource pool. That is, it provides fully-instrumented, community-supported, hardware/software/knowledge resources for the business to develop code segments for enterprise usage. Direct cost saving is achieved via the sharing of common lab resources and its associated services.

The portal further functions as a motivator. Job satisfaction depends to a great extent on the enterprise's ability to keep its developer community engaged in high-tech projects. The portal provides the opportunity to collaboratively develop solutions that use cutting edge technology. It is a motivator that can produce cost savings due to increased employee retention.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments shown, by way of example only, in the accompanying drawings wherein.

DETAILED DESCRIPTION OF THE INVENTION

Figure 1:
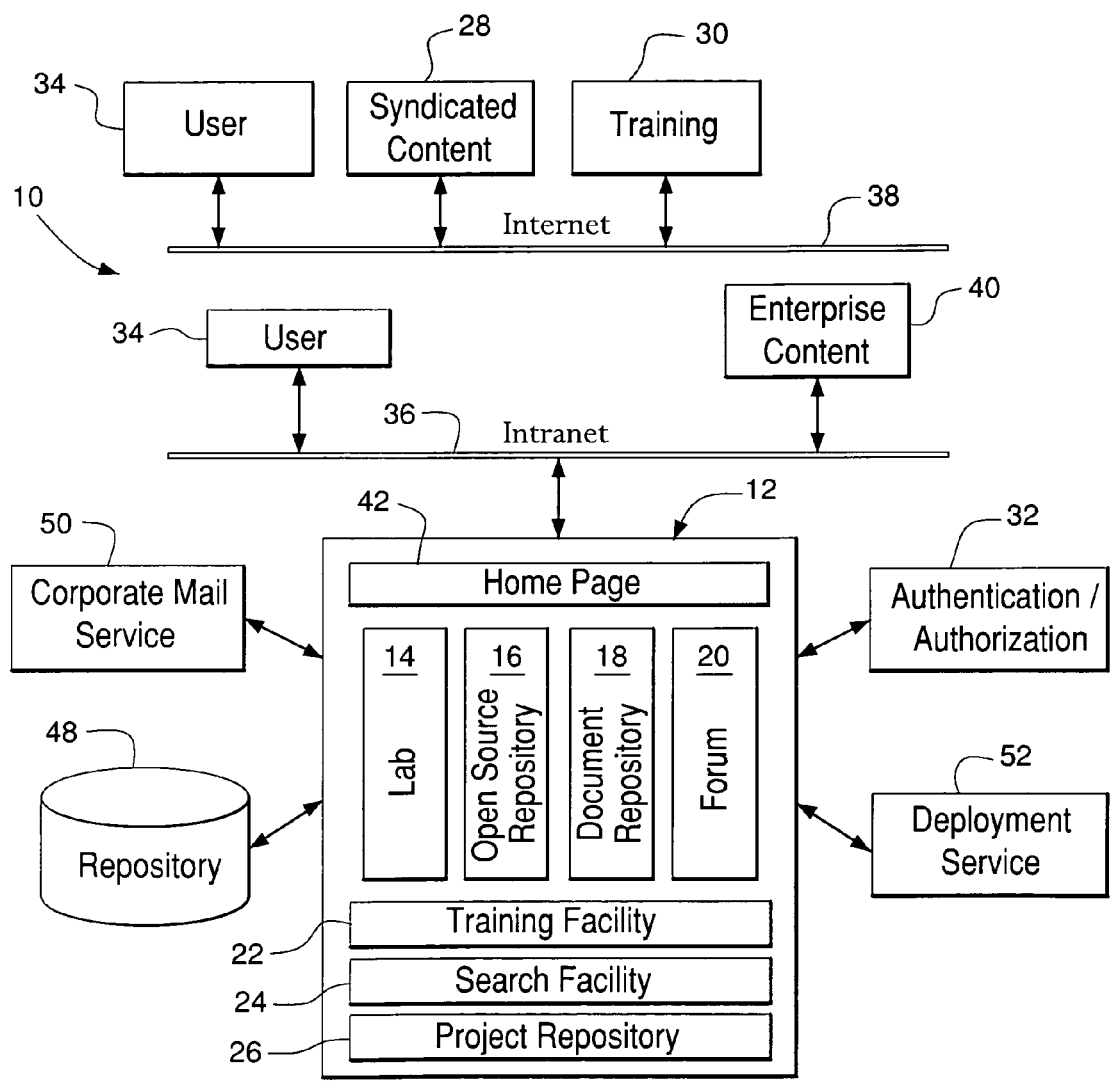
FIG. 1 is a schematic depiction of the high-level components of the system according to the present invention in the context of the overall system architecture.

Referring to FIG. 1, there is shown in schematic form a Web-based system according to the invention for enabling collaborative interaction among groups and individuals of a business enterprise, generally identified by reference numeral 10. System 10 comprises a developers' resource portal or, simply, "portal" 12 that is the entry point for all users of the system. Portal 12 provides a consistent interface to the available portal services and information including, without limitation, internal content and services such as lab 14, open source repository 16, document repository 18, forum 20, training facility 22, search facility 24 and a project repository 26, as well as external content and services such as syndicated content 28 and training 30.

Each user will be considered by default as a "Portal User." Depending on the privileges ascribed to the user, the system might also assign the role of:

"Portal Manager" (a person authorized to manage the content and workflows within portal 12);

"Portal System Administrator" or "Portal SA" (a person authorized to administer portal 12);

"Forum Moderator" (a person authorized to moderate one or more services provided within a category of forum 20 (which is described in greater detail hereinafter));

"Project Moderator" (a person authorized to moderate one or more services provided within the context of a portal project (which is described in greater detail hereinafter)); and/or "Lab Manager" (a person authorized to manage the services provided by a lab 14 (which is described in greater detail hereinafter)).

The foregoing names associated with these additional roles are merely for description purposes. Hence, any corresponding names may be assigned thereto consistent with the associated functions of the particular roles. Moreover, it is also contemplated that other additional roles may be defined that describe other functions that may be performed by system 10 and that require defined user permissions or privileges to execute those functions. They are also non-exclusive. For example, a Portal Manager, who is by default a Portal User, may also acquire the role of a Forum or Project Moderator.

When entering portal 12, each user will be authenticated and authorized using an interface to a Kerberos and a corporate LDAP or other suitable authentication and authorization service 32 established in the business organization. At that moment, a specific session ID and a specific role will be assigned with a set of attributes and privileges. During a user authorization and authentication phase portal 12 will verify if the user is entering the portal for the first time. If so, the Portal User will be presented with a Profile page which will allow the user to specify personal profile information with regards to interests and self-classification. As shown in FIG. 1, a Portal User or, simply, "user" 34 may access portal 12 through either a corporate Intranet 36 via a suitably-configured workstation or the Internet 38 via a PC, laptop computer, PDA, cellular telephone or the like. As is known, Intranet 36 enables user 34 to access enterprise content 40 of particular interest to the enterprise.

Once authorized and authenticated, portal 12 presents each Portal User 34 with a home page 42 (FIG. 1). The home page has certain default content and is preferably dynamic and customizable, allowing a Portal User 34 to add or delete specific services offered by the various categories of the Portal. The default content of home page 42 provides the user with access to the global services offered by the portal 12 and preferably includes: a global search function, a help facility, a calendar of events to post corporate-wide or departmental events, a reward/recognition postings to promote active participation, a customization service for content and services including access to a Profile page, access to a Polling service (described below), and access points to content/services 14-30 and 40.

Figure 2:
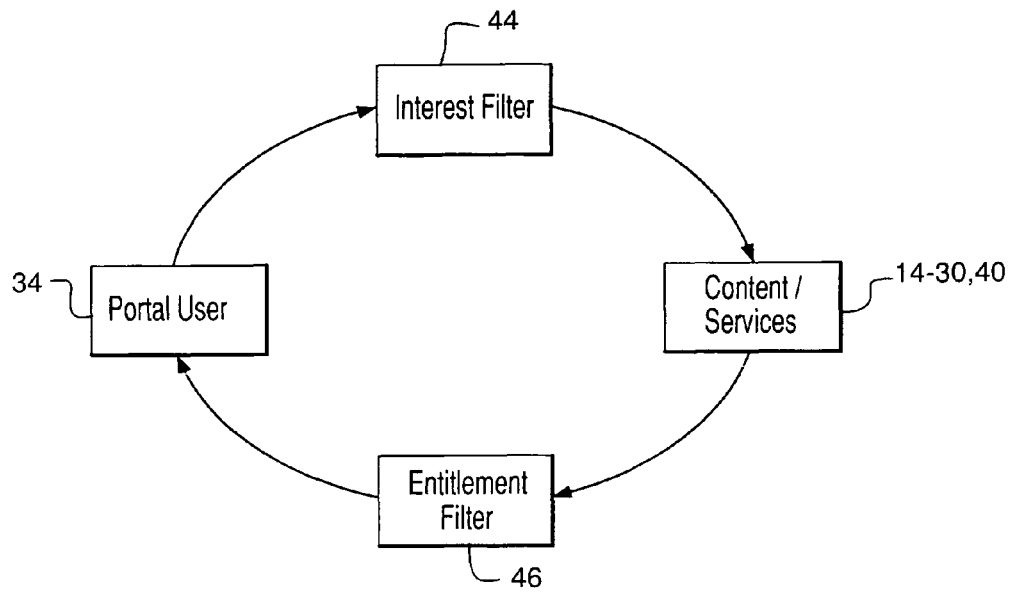
FIG. 2 is a schematic depiction of how users of the present system may be matched with appropriate content given their particular entitlement or permissions level.

Portal 12 further includes a "community" facility. This facility allows a portal user to dynamically create a personal and logical grouping of any kind of portal content that the user is currently interested. Grouping of content in this way establishes the interest filter 44 depicted in FIG. 2, which figure illustrates how users are matched with appropriate content given their specific entitlements. More specifically, once at the home page, a Portal User 34 conducts a search for certain information using portal 12. The system then applies a user-customized interest filter 44 to the request to narrow the scope of search to the user's desired categories or classes of content/ services available in the system. The system then searches the appropriate content and/or services category or categories based on the user's interest filter settings. Having retrieved the requested information, system 10 then applies an entitlement filter 46 to the retrieved information. The entitlement filter sorts permissible information from impermissible information based on the user's particular entitlements or permissions and then passes the permissible information back to the Portal User 34. The entitlement filter manages access to content and services as follows.

Private

The content/services 14-30 and 40 of system 10 are open only to a specific group of Portal Users 34, assigned by the content owner or moderator. The content will not be shown to non-members, i.e., a content search will not refer to the content even if it is matched by the search criteria input by the user.

Read/No Contribution

This represents a situation in which the content/forum services of system 10 are semi-private and only available to a specific group of Portal Users 34, which will be able to read and post content. Non-members will only be able to read the content and a content search will return a reference when the search criteria match.

Read/Contribute

This represents a situation in which the content/forum services of system 10 are open to any Portal User 34 for reading and contribution. Contribution in this context will allow submission of content, but does not include the ability to modify existing content. For optimum exchange of information, it is preferred that most of the content/forum services fall under the read/contribute classification.

All content incorporated into system 10 is desirably classified and categorized for efficient search and retrieval. To achieve this result, the content management system/search engine thus preferably allows for a combination of automated and manual workflow based content tagging.

Portal 12 preferably includes a dynamic page composer (e.g., an Enterprise Java Bean that interfaces to the global search engine) for receiving content from various sources, dynamically formatting the content using standard presentation templates, and presenting it to Portal Users with a consistent look and feel that adheres to the user's profile settings. Each presentation page will be persisted in a presentation repository which holds the customization information of all pages within the context of portal 12 (including the home page) for each user. The presentation repository may be part of repository 48 (FIG. 1) of system to which portal 12 interfaces to Sybase®, UDB® and related data and business applications typically available within the enterprise. The presentation repository also holds the information of templates or default pages for each page displayed by any of the services provided within in portal 12. Repository 48 preferably includes an archive system for off-line storage of document repository content.

System 10 additionally comprises a notification service for presenting notifications to individual Portal Users. Notifications are considered asynchronous since it cannot be guaranteed that a Portal User will be in an active session at the time a notification is sent out. Notifications may vary in complexity and may either service-to-service events or e-mail notifications from one Portal User to a group of Portal Users which may include attachments/content. As is known, e-mail notifications may transmitted via an appropriate corporate mail service 50 (FIG. 1) such as Microsoft® Outlook or equivalent service. System 10 will leverage existing enterprise mail as a notification service (sending out notifications to Portal Users) with a standard application program interface API on the top layer. A repository will be used to temporarily store a queue of notifications for Portal Users. An interface to a repository will be used for the attachments of a notification, e.g., notification of new versions of documentation, administrative notifications and advertisement of new content.

System 10 provides an integrated services platform for building, packaging, integration testing and product deployment. The platform allows for the packaging and release of reference applications from open source projects. The deployment service of the platform, reference numeral 52 of FIG. 1 for leveraging existing business enterprise tools such as, for example, those offered by Marimba, Inc. As a result, a Portal User may easily deploy an application from deployment service 52 into a lab 14 workspace or to a system located outside of portal 12.

For active workflow management, system 10 preferably utilizes a lightweight workflow to allow Portal Users and Portal Mediators to manage the flow of content into the portal. This functionality insures the quality of portal content as well as allowing complete categorization of content in order to optimize retrieval.

Although not illustrated in FIG. 1, portal 12 also preferably supports a help facility. The help facility provides frequency asked questions (FAQ) lists which allow a novice Portal User to navigate within the portal. A reference to the FAQ list is desirably a permanent part of the home page of each Portal User, as well as a reference to a Help discussion group within the forum category 20. The Help discussion group may be used by Portal Users looking for a particular help topic or solution after they have searched unsuccessfully through the FAQ list. The questions and answers submitted by Portal Users will be periodically summarized and integrated into the FAQ list. The help facility will be context sensitive.

Portal 12 also preferably includes a customization service for content and services. The customization features allow a user to create an individualized home page similar to those that can be created at "My Yahoo" at the "Yahoo" website and other known Web portals. Both the user interface layout and subscriptions to specific channels of content may be customizable.

Another preferred although not illustrated feature of portal 12 is a polling service or facility. The polling service allows Portal Users to instantiate a customizable poll. Exemplary polls that may be generated include discussion polls, schedule polls, invitation polls, opinion polls and organizer polls.

These polls can also be used by the portal manager/moderators to build consensus on technical decisions.

Portal 12 also preferably includes a static code analyzer service for ensuring code quality and scalability of basic code service. In many circumstances, the Portal User will have the ability to submit code for review. The static code analyzer service analyzes the code with respect to patterns, coverage, threading and performance. Patterns used within the code will to a certain extent be automatically identified and the code will be analyzed for the applicability of well-known patterns. Feedback may be provided by the static code analyzer service regarding how to correctly implement or apply patterns by identifying or suggesting a specific pattern or pattern usage. The static code analyzer preferably identifies code pieces that are unexecutable. The service may optionally allow for the manual or automatic removal of those code pieces. While analyzing the code, possible causes for stalls, deadlocks and race conditions will be detected/predicted and identified. The service provides performance measurements and identifies bottlenecks such as excessive object usage, over-use of specific objects or loitering objects.

The feedback from the static code analyzer service may include reports displaying measurements of code complexity, usability and scalability. An additional feature will be the performance of code beautification in accordance with selected guidelines. This functionality relieves the workload of the Portal Manager group and enhances focus on those code pieces which have been identified as business critical.

Portal 12 includes an external content service provider interface whereby a Portal user may access external services such as syndicated content 28 and training 30 (FIG. 1). The external content service provider interface thus allows content provided by organizations and companies such as Gartner, Inc., International Business Machines Corporation and Sun Microsystems, Inc., among many others, to be pushed into portal 12. The portal will then forward the content either straight to Portal User pages or through a particular workflow into the content management system.

Portal 12 further includes an unillustrated content management facility that preferably supports any standard file formats. The content management facility is preferably creation tool-independent and includes version control mechanisms (check-in/check-out) and other aspects of version history management. The document repository 18 and the content categorization services are integrated with the active workflow management service.

The lab 14 provides standardized workspaces to Portal Users that are representative of the enterprise's production environments. These workspaces are private and standardized development environments. They can only be populated with reference applications downloaded from the portal's unillustrated application repository. These workspaces are leased for a finite time period to facilitate exploratory development in the context of a specific reference application. This allows a Portal User to modify existing components or deploy new components into a selected portal reference application.

Lab 14 is a fully instrumented and ready-to-use collection of private workspaces. The services in the lab are strongly coupled with all other portal verticals. The workspaces are used in conjunction with executing, experimenting and learning with a reference application. To illustrate, a portal user seeking to learn about certain technology through experimentation first leases a lab session. A reference application that highlights the subject technology is then deployed using standard deployment services. Being fully instrumented, the lab session requires no setup by the user. In this scenario, the user becomes rapidly becomes productive by playing the role of a developer, by being able to extend the functionality in the reference application or by deploying his/her own logic in the form of a bean.

The open source repository 16 is an online source code control system which supports all traditional source code control features, such as check-in/check-out, major/minor release numbers and source code associations and revisions.

The document repository 18 is a vertical category within portal 12 and provides services for the creation, modification and publication of content. Content includes general documentation such as, for example, best practices, white papers, and benchmark results. References to external syndicated content 30 by organizations and companies such as Gartner, Inc., International Business Machines Corporation, Sun Microsystems, Inc. and Forrester Research, Inc., among many others, are also preferably included in document repository 18. In addition, it is desirable that all published documentation first pass through a mediated review/approve workflow to insure that its content is appropriate for system 10 before becoming stored in the document repository.

The forum 20 provides a set of tools and services that promote communication, cooperation, knowledge exchange, and ownership across the entire developer community. Forum 20 enhances the collaborative capabilities of the system with discussion groups and a chat service.

Figure 3:
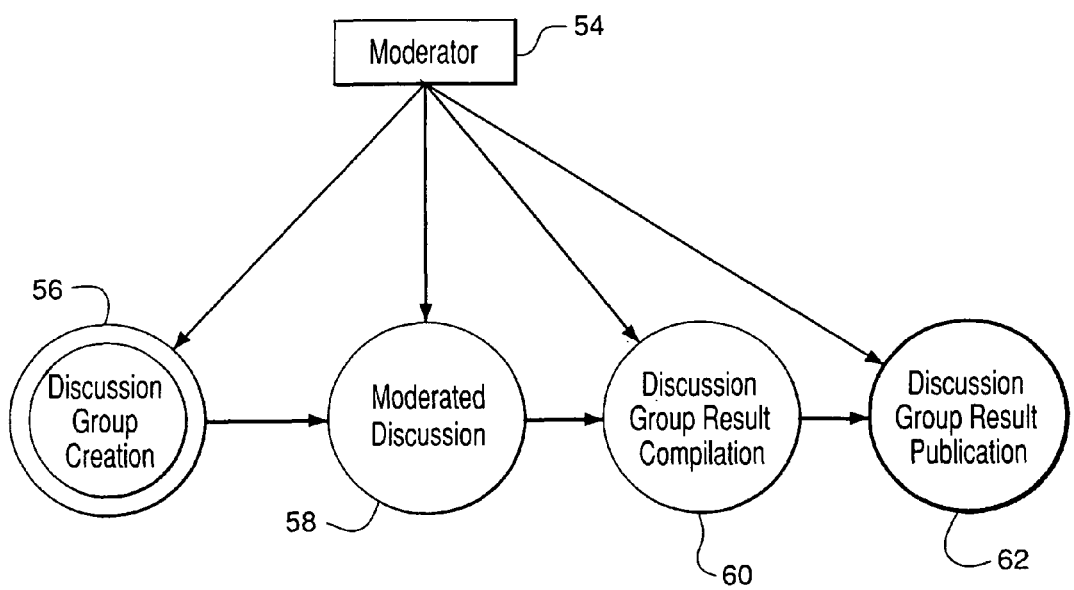
FIG. 3 is a schematic depiction of a discussion group life cycle according to the system and method of the present invention.

Discussion groups are Web-based, persistent, searchable, approved and moderated discussion forums where specific topics are discussed in detail amongst the forum members. In contrast to a chat session, they are considered as "long living." Discussion groups will be support or goal oriented, where the latter could result in an Open Source Project as collaborative development or in a reference application. Each particular discussion group will have one or more active threads of conversation (discussion threads). In operation, a Portal User requests a discussion group. A shown in FIG. 3, after approval by a Portal Manager and registration of the topic within the portal 12 for search purposes, the Portal User becomes the moderator 54 of the created discussion group 56. Monitored by the moderator, the discussion continues for a period of time as moderated discussion 58. Every time the discussion produces a significant conclusion, solution, idea, or concept, the moderator will be responsible for compiling, summarizing and archiving the discussion group results at step 60. Thereafter, the moderator publishes the discussion group results at step 62. This functionality facilitates faster and more convenient access to such content by the Portal User community at large.

The chat service provided by portal 12 is preferably will be similar to the INSTANT MESSENGER rapid information exchange service provided by America Online. It preferably supports simultaneous chat sessions on a system and user basis. Each chat session represents a one-to-one or one-to-many communication between Portal Users. Unlike discussion groups, chat sessions are non-searchable and limited in duration. After invocation, the Portal User will be able to invite other active Portal Users into the chat session. Once a session is established, participants will be able to communicate and exchange limited content. The chat service will rely on Portal Users defining significant content and being responsible for its submission.

The training facility 22 of portal 12 offers tactical training directly relevant to specific development tasks. Training offered by the training facility is highly focused and timely, contains the proper level of detail for the knowledge/skills level of particular user or group of users, provides ease of accessibility and execution, and remains completely self-contained. The training facility 22 is designed to attract all levels of Java developers with interactive lessons and on-line reference material and Java-related content. It is a horizontal category spanning the vertical categories lab 14, open source repository 16, document repository 18 and forum 20 and utilizes services from each of the vertical categories to accelerate the learning curve of each Portal User. Services offered by the training facility include interactive lessons, on-line seminars, technical mentoring and access to reference libraries (e.g., libraries containing articles, tutorials, blueprints, white papers, case studies, and so on). In addition, as indicated by reference numeral 32 of FIG. 1, training may also be provided and hosted externally of portal 12 with a focus on customized business enterprise training needs.

Online training seminars are divided into two categories: portal-hosted and portal-managed. A portal-hosted training seminar will provide the entire training experience within the context of portal 12. A portal-managed training course will provide access to an externally hosted training program which, within system 10, is managed but not hosted by portal 12. The portal also includes an unillustrated training catalog service. This service is a searchable catalog of all portal-hosted and portal-managed training courses. It includes an interface to the Portal User profiles, pre-requisites, and course description and cost.

Portal 12 also preferably includes an unillustrated student curriculum development and tracking facility for providing Portal Users with the ability to perform a career path mapping. With the student curriculum development and tracking facility various job titles within an enterprise may be mapped to corresponding educational requirements such as "has written a specification" or "has written a requirements document." The service will then provide an overview of what the Portal User has achieved to date and how he or she needs to proceed to become eligible for a certain position. Portal 12 manages the curriculum and provides automated workflows for charge back, eligibility requirements, approval, etc., for all training courses.

As reflected in FIG. 1, system 10 provides multiple horizontal and vertical content and services. System 10 enables users to conduct global and content/service-specific searches within and outside of the portal via the search facility 24. Search facility 24 enables a Portal User to search for specific content incorporated in system 10. When content is incorporated into the portal, it is categorized by the association of a set of metatags. The metatags preferably contain information including access rights, the type of content, and the mortality of the content. A search can be conducted using a particular word or phrase in a context-sensitive fashion. Unless a global search is started at the Portal User's home page, it will be performed within a selected vertical. For instance, if the Portal User starts the search within the forum 20 or document repository 18, it returns only the results (content or references to content) from that particular vertical, i.e., from either the forum 20 or document repository 18. In the event the search is initiated at the home page, a global search will be performed first horizontally, then vertically, with the results being derived from all verticals in portal 12.

The Portal User thus has the ability to influence search results by limiting the scope to a particular vertical or subcategory, performing a progressive search, applying multiple filters to narrow the search or indicating the behavior of the search through profile data. In addition, the search engine preferably includes an automated mechanism to scan input documents to create suggestive metatags. The content submitter may then be given the opportunity to review and modify the assigned metatags.

The project repository 26 of portal 12 contains projects developed by portal 12. A particular portal project can explicitly associate a community of Portal Users and a collection of existing and dynamic portal content. The project repository 26 persists the logical grouping of project content.

Portal 12 also possesses project release management capability. Project release management is a facility to be used by portal managers and project moderators to create a project release manifest. The purpose of this manifest is to persistently capture the relevant versions of the portal content associated with the particular release of a project.

Reference applications are realistic and representative implementations of standard technologies that highlight their proper and appropriate usage in solving patterns of the enterprise's business problems. These implementations are not necessarily complete solutions but could easily be copied and extended to adapt to a given situation. These reference applications could be derived from external vendors' reference applications (e.g., Java 2 Platform, Enterprise Edition (J2EE) blueprints), industry, development portal consortium, and the enterprise's internal development community.

The following three scenarios demonstrate the value of reference applications and the capability of sytem 10 to effectively utilize those applications.

Scenario 1

A Portal User wants to use a certain reference application technology to build a business application. To accomplish this, the user first needs to understand how the technology works with minimum setup or preparation. The user selects a reference application and the reference application is immediately activated (i.e., there is no set up or application deployment). The user then interacts with the reference application by playing the role of an end user to measure its performance, scalability and usability. When finished, the user understands the capabilities and bounds of the underlying technology.

Scenario 2

The user has some understanding of a particular technology and would like to become proficient in its usage. In this scenario the user is given a hands-on opportunity to quickly become proficient. To do so, the user leases a lab session and chooses a reference application contains the technology of interest. Using standard deployment services, the reference application is deployed to the leased private session. The lab 14 provides all the services and properly configured environment for running and extending the reference application. The leased session in lab 14 provides all the necessary facilities that the user needs to play the role of a hands-on developer by experimenting with the code, extending it, building and deploying his or her own logic. In this way, the user gains hands on experience in usage of the reference application and can immediately become productive with no setup.

Under constraints established by the particular Lab Manager, the user is limited by the lease on the lab session, and is limited by the type of change that could be effected on the session.

Scenario 3

An advanced user wants to experiment and extend a reference application without any restrictions of the standard lab environment. To do this, the user creates and sets up his/her own environment physically outside portal 12. A reference application is then selected by the user and deployed to this environment. In this scenario the user is responsible for proper configuration and setup. When deployed, the user may extend the reference application and deploys additional code modules. In this way, the user becomes more proficient with the underlying technology and its usage.

The portal 12 is deployed as a production system and the primary service-level requirements for portal 12 are identified herebelow. System qualities reflect current and evolving goals for the system as it fits into an operational and business environment. This list is not exhaustive but is intended to capture what are believed to be the most important requirements.

Performance, Throughput and Scalability

Portal 12 is preferably able to support at least several hundred to several thousand IT users globally, with capacity for additional scalability as needed. In order to measure the performance of the system, metrics are gathered and used to tune the performance of system 10.

Reliability and Availability

This defines a standard set of service level agreements including administration, maintenance, general availability and reliability.

Security

Access to portal 12 is granted only to the enterprise's employees by incorporating access to the chosen authentication and authorization services of the enterprise. Since different roles are anticipated in the portal, each Portal User will have an individual profile which includes the entitlements/access rights to the various data and workflows within the portal. Modifications to the roles and entitlements will take effect immediately, so that access rights to a specific application or data set can be granted or denied in real time.

The user sessions are preferably monitored by a session watchdog which tracks each session and terminates them in case they have exceeded a preset time-out limit. Once the session is terminated the Portal User will have to re-authenticate. Each session initiated by a Portal User will be logged from beginning to end to prevent system fraud.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A computer-system implemented method comprising:
    receiving a selection of an extendable reference application;
    providing, for a finite period of time, a private lease of an experimental lab workspace from a collection of experimental lab workspaces, representative of a production environment for running the extendable reference application;
    providing a development environment within the leased experimental lab workspace for modifying the extendable reference application;
    populating the leased experimental lab workspace with the extendable reference application;
    receiving via the development environment a modification to the extendable reference application, wherein the modification includes modifying existing components based on user created logic or deploying new components into the extendable reference application;
    evaluating, using a static code analyzer, the user created logic or the new components to determine code quality and scalability, wherein evaluating the user created logic or the new components includes evaluating patterns, coverage, threading, and performance;
    extending, when the user created logic or the new components meet code quality and scalability standards, via a computer-system the extendable reference application with the modification; and
    running the extended reference application in the leased experimental lab workspace.

2. The computer-system implemented method of claim 1, wherein populating the leased experimental lab workspace further comprises downloading the extendable reference application from an application repository to the leased lab workspace.

3. The computer-system implemented method of claim 1, wherein the extending of the extendable reference application further comprises limiting the extending of the extendable reference application based on constraints associated with the leased experimental lab workspace.

4. The computer-system implemented method of claim 1, wherein the selection of the extendable reference application is received from a portal user.

5. The computer-system implemented method of claim 4, wherein extendable reference applications available for selection by the portal user are based on the portal user's entitlements.

6. The computer-system implemented method of claim 2, wherein the leased experimental lab workspace can only be populated with reference applications from the application repository.

7. The computer-system implemented method of claim 1, further comprising providing feedback generated by the static code analyzer regarding how to correctly implement or apply patterns.

8. The computer-system implemented method of claim 7, wherein the feedback includes reports displaying measurements of code complexity, usability, and scalability.

9. The computer-system implemented method of claim 1, wherein evaluating, using the static code analyzer, the user created logic or the new components includes identifying code pieces that are unexecutable.

10. The computer-system implemented method of claim 1, wherein evaluating, using the static code analyzer, the user created logic or the new components includes identifying possible causes of stalls, deadlocks, and race conditions.

11. The computer-system implemented method of claim 1, wherein evaluating, using the static code analyzer, the user created logic or the new components includes generating performance measurements.

12. The computer-system implemented method of claim 1, wherein evaluating, using the static code analyzer, the user created logic or the new components includes identifying bottlenecks.

13. The computer-system implemented method of claim 12, wherein the bottlenecks include excessive object usage, over use of specific objects, or loitering objects.

14. A system comprising:
    a portal configured to receive a selection of an extendable reference application;
    means for providing, for a finite period of time, a private lease of an experimental lab workspace from a collection of experimental lab workspaces, representative of a production environment for running the extendable reference application;
    means for providing a development environment within the leased experimental lab workspace for modifying the extendable reference application;
    means for populating the leased experimental lab workspace with the extendable reference application;
    means for receiving via the development environment a modification to the extendable reference application, wherein the modification includes modifying existing components based on user created logic or deploying new components into the extendable reference application;

means for evaluating, using a static code analyzer, the user created logic or the new components to determine code quality and scalability, wherein evaluating the user created logic or the new components includes evaluating patterns, coverage, threading, and performance;

means for extending, when the user created logic or the new components meet code quality and scalability standards, via a computer-system the extendable reference application with the modification; and means for running the extended reference application in the leased experimental lab workspace.

15. The system of claim 14, further comprising a dynamic page composer configured to receive content from multiple sources and dynamically format the content using standard presentation templates.

16. The system of claim 14, further comprising a notification service configured to present notifications to individual portal users.

17. The system of claim 14, further comprising a workflow manager to manage content flow into the portal.

18. The system of claim 14, further comprising an online source code control system and a document repository.

19. The system of claim 14, further comprising a training facility to provide training directly relevant to specific development tasks.

20. A system comprising:
a portal configured to receive a selection of an extendable reference application;
means for providing, for a finite period of time, a private lease of an experimental lab workspace from a collection of experimental lab workspaces, representative of a production environment for running the extendable reference application;
means for providing a development environment within the leased experimental lab workspace for modifying the extendable reference application;
means for populating the leased experimental lab workspace with the extendable reference application;
means for receiving via the development environment a modification to the extendable reference application, wherein the modification includes modifying existing components based on user created logic or deploying new components into the extendable reference application;
means for evaluating, using a static code analyzer, the user created logic or the new components to determine code quality and scalability, wherein evaluating the user created logic or the new components includes identifying possible causes of stalls, deadlocks, and race conditions;
means for extending, when the user created logic or the new components meet code quality and scalability standards, via a computer-system the extendable reference application with the modification; and
means for running the extended reference application in the leased experimental lab workspace.

21. The system of claim 20, further comprising a dynamic page composer configured to receive content from multiple sources and dynamically format the content using standard presentation templates.

22. The system of claim 20, further comprising a notification service configured to present notifications to individual portal users.

23. The system of claim 20, further comprising a workflow manager to manage content flow into the portal.

24. The system of claim 20, further comprising an online source code control system and a document repository.

25. The system of claim 20, further comprising a training facility to provide training directly relevant to specific development tasks.

26. A computer-system implemented method comprising:
receiving a selection of an extendable reference application;
providing, for a finite period of time, a private lease of an experimental lab workspace from a collection of experimental lab workspaces, representative of a production environment for running the extendable reference application;
providing a development environment within the leased experimental lab workspace for modifying the extendable reference application;
populating the leased experimental lab workspace with the extendable reference application;
receiving via the development environment a modification to the extendable reference application, wherein the modification includes modifying existing components based on user created logic or deploying new components into the extendable reference application;
evaluating, using a static code analyzer, the user created logic or the new components to determine code quality and scalability, wherein evaluating the user created logic or the new components includes identifying possible causes of stalls, deadlocks, and race conditions;
extending, when the user created logic or the new components meet code quality and scalability standards, via a computer-system the extendable reference application with the modification; and
running the extended reference application in the leased experimental lab workspace.

27. The computer-system implemented method of claim 26, wherein populating the leased experimental lab workspace further comprises downloading the extendable reference application from an application repository to the leased lab workspace.

28. The computer-system implemented method of claim 26, wherein the extending of the extendable reference application further comprises limiting the extending of the extendable reference application based on constraints associated with the leased experimental lab workspace.

29. The computer-system implemented method of claim 26, wherein the selection of the extendable reference application is received from a portal user.

30. The computer-system implemented method of claim 29, wherein extendable reference applications available for selection by the portal user are based on the portal user's entitlements.

31. The computer-system implemented method of claim 27, wherein the leased experimental lab workspace can only be populated with reference applications from the application repository.

32. The computer-system implemented method of claim 26, wherein evaluating, using the static code analyzer, the user created logic or the new components to determine code quality and scalability includes evaluating patterns, coverage, threading and performance.

33. The computer-system implemented method of claim 26, further comprising providing feedback generated by the static code analyzer regarding how to correctly implement or apply patterns.

34. The computer-system implemented method of claim 33, wherein the feedback includes reports displaying measurements of code complexity, usability, and scalability.

35. The computer-system implemented method of claim 26, wherein evaluating, using the static code analyzer, the user created logic or the new components includes identifying code pieces that are unexecutable.

36. The computer-system implemented method of claim 26, wherein evaluating, using the static code analyzer, the user created logic or the new components includes generating performance measurements.

37. The computer-system implemented method of claim 26, wherein evaluating, using the static code analyzer, the user created logic or the new components includes identifying bottlenecks.

38. The computer-system implemented method of claim 37, wherein the bottlenecks include excessive object usage, over use of specific objects, or loitering objects.

* * * * *